US012203437B2

(12) United States Patent
Whetzel

(10) Patent No.: US 12,203,437 B2
(45) **Date of Patent: *Jan. 21, 2025**

(54) ASSEMBLY AND METHODS FOR PUMPING WATER TO SHORE

(71) Applicant: Christopher Lory Whetzel, Apollo Beach, FL (US)

(72) Inventor: Christopher Lory Whetzel, Apollo Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,191

(22) Filed: Feb. 8, 2024

(65) Prior Publication Data

US 2024/0175420 A1 May 30, 2024

Related U.S. Application Data

(63) Continuation of application No. 17/449,852, filed on Oct. 4, 2021, now Pat. No. 11,933,260.

(51) Int. Cl.
*F03B 13/00* (2006.01)

(52) U.S. Cl.
CPC .................................... *F03B 13/00* (2013.01)

(58) Field of Classification Search
CPC ....................................................... E03B 13/00
See application file for complete search history.

(56) References Cited

U.S. PATENT DOCUMENTS

| | | | | |
|---|---|---|---|---|
| 5,779,885 A * | 7/1998 | Hickok | C02F 3/082 | 210/150 |
| 6,021,095 A * | 2/2000 | Tubel | E21B 47/20 | 166/166 |
| 6,189,811 B1 * | 2/2001 | Rudy | F04B 17/006 | 239/525 |
| 7,469,748 B2 * | 12/2008 | Ocalan | E21B 43/129 | 166/372 |
| 10,677,032 B1 * | 6/2020 | Norton | E21B 34/14 | |
| 2004/0262206 A1 * | 12/2004 | Gettman | B01D 61/08 | 210/182 |
| 2008/0237105 A1 * | 10/2008 | Prokopchuk | C02F 1/003 | 210/242.1 |
| 2010/0051546 A1 * | 3/2010 | Vuong | C02F 1/441 | 210/124 |
| 2011/0247970 A1 * | 10/2011 | Evingham | B01D 29/52 | 210/85 |
| 2013/0098816 A1 * | 4/2013 | Elfstrom | C02F 1/001 | 210/153 |
| 2014/0356198 A1 * | 12/2014 | Rulli | F04B 17/006 | 417/360 |

(Continued)

*Primary Examiner* — Kevin R Barss
(74) *Attorney, Agent, or Firm* — Dunlap Bennett & Ludwig, PLLC

(57) ABSTRACT

A submersible pump assembly that is capable of transporting water from a body of water, and methods of use thereof, are herein disclosed. The pump assembly includes a submersible pump, a power source for the pump, and a hose that pumps water from the body of water to a location on land. In certain embodiments, one or more filters may be used to remove particulates from the water prior to entering the submersible pump. Further, an anchor and warning pole may be incorporated to prevent the submersible pump from being displaced, and to provide notification to others in the water of the presence of the submersible pump and anchor.

6 Claims, 4 Drawing Sheets

(56) References Cited

U.S. PATENT DOCUMENTS

| | | | | |
|---|---|---|---|---|
| 2015/0166150 | A1* | 6/2015 | Derenoncourt | E21B 43/0122<br>114/259 |
| 2018/0266074 | A1* | 9/2018 | Halkyard | E02F 7/005 |
| 2020/0131893 | A1* | 4/2020 | McCreery | B65H 75/425 |

* cited by examiner

ASSEMBLY AND METHODS FOR PUMPING WATER TO SHORE

CROSS-REFERENCE TO RELATED APPLICATION

This application claims the benefit of priority of U.S. non-provisional application Ser. No. 17/449,852, filed Oct. 4, 2021, as a continuation thereof, the contents of which are herein incorporated by reference.

BACKGROUND OF THE INVENTION

The present invention relates to water pumps and, more particularly, to a portable water pump for bringing ocean water onto a beach.

When at the beach, there is no efficient way to transport ocean water onto the beach (beyond the shoreline). Many beach activities need ocean water, which typically requires manually filling up buckets to move water wherever needed, which is laborious and results in very little water being transferred per bucket. Even further, this does not provide flowing water. Exemplary beach activities may include, but are not limited to, filling up a sandcastle mote, moistening sand for a sand sculpture, filling a portable swimming pool, spraying oneself or others, rinsing sand off oneself or other articles brought to the beach, etc.

The prior art is wholly inadequate to solve this problem. For example, a non-submersible pump, such as a liquid transfer pump, would not work because it would get clogged by the sand, shells, and rocks. Further, adding an intake filter to a liquid transfer pump would also become easily clogged. In general, other pumps do not work in a repeatable, sustainable way. As another example, industrial solutions exist for moving ocean water. However, as they are intended for commercial-scale transport of water, they are bulky, heavy, and, in general, entirely unsuitable for person use at a beach.

As can be seen, there is a need for a compact, portable water pump for bringing water from a larger body of water to shore.

SUMMARY OF THE INVENTION

In one aspect of the present invention, an assembly for pumping water from a body of water to a location comprises: a submersible pump configured to be submerged in the body of water and to pump the water; a power source for powering the submersible pump; a hose operably coupled to the submersible pump for transporting the water from the body of the water to the location; and at least one filter at least partially enclosing the submersible pump and being configured to filter out particles from the water over a predetermined size.

In another aspect of the present invention, an assembly for pumping water from a body of water to a location comprises: a submersible pump configured to be submerged in the body of water and to pump the water; a power source for powering the submersible pump; a hose operably coupled to the submersible pump for transporting the water from the body of the water to the location; and an anchor configured to secure to a floor of the body of water and configured to maintain the submersible pump approximately in place in the body of water.

In yet another aspect of the present invention, a method for pumping water from a body of water to a location, the method comprising the steps of: (1) providing an assembly comprising: a submersible pump configured to be submerged in the body of water and to pump the water; a power source for powering the submersible pump; a hose operably coupled to the submersible pump for transporting the water from the body of the water to the location; and at least one filter at least partially enclosing the submersible pump and being configured to filter out particles from the water over a pre-determined size; and an anchor configured to secure to a floor of the body of water and configured to maintain the submersible pump approximately in place in the body of water; (2) securing the anchor to the floor of the body of water; (3) submerging the submersible pump in the body of water; (4) coupling the submersible pump to the anchor; and (5) pumping water, via the submersible pump, through the house to the location. In certain embodiments, step of providing an anchor (and associated steps of securing it to the floor and coupling the submersible pump) may be omitted, as discussed in greater detail below.

These and other features, aspects and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
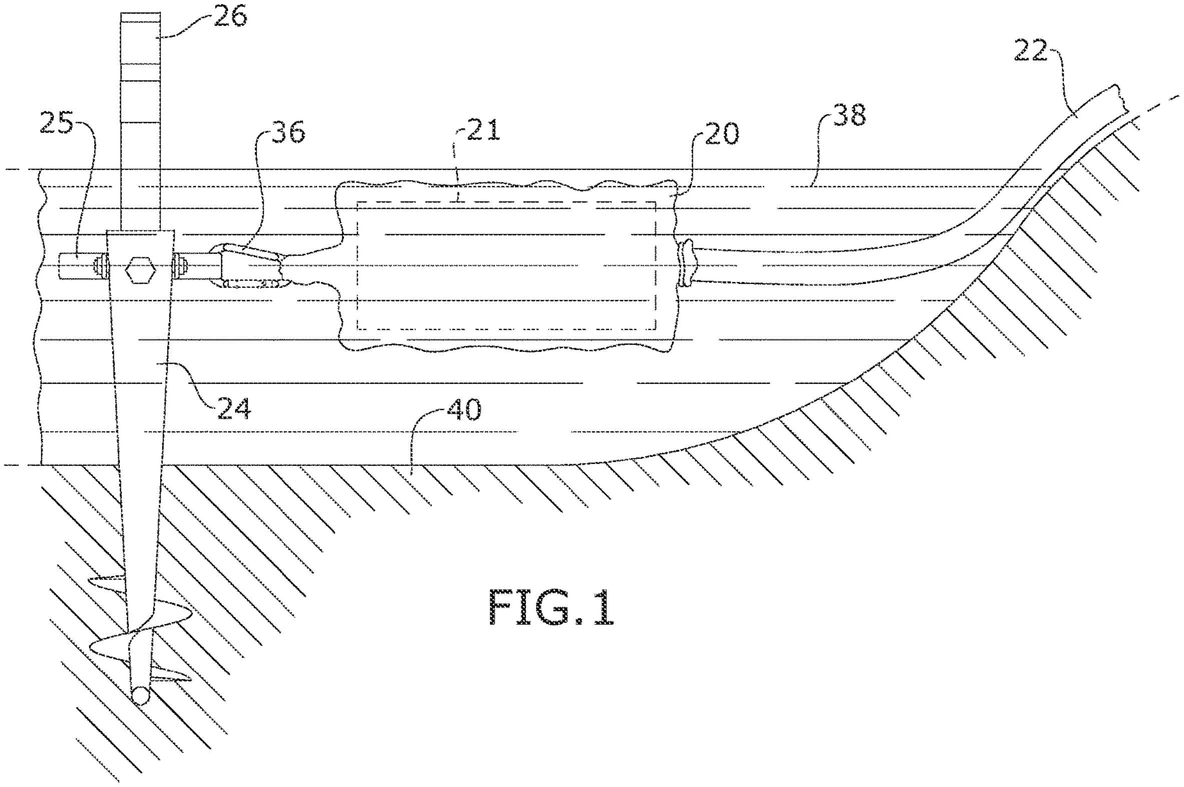
FIG. 1 is a front view of an embodiment of the present invention, shown in use at a beach.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details.

Broadly, one embodiment of the present invention is a submersible pump assembly that is capable of transporting water from a body of water (e.g., ocean) to another location (e.g., somewhere on the beach). Those with skill in the art will, of course, appreciate that, while the present invention is described primarily in the context of the beach and ocean, it is perfectly suitable and advantageous for use with other bodies of water, such as lakes, rivers, etc. Embodiments of the present invention may be powered via battery power and/or solar power, the selected one of which running a submersible pump. The submersible pump is positioned in the ocean (or other body of water), draws in water through a series of filters and moves the water up to the beach (or other body of land) through a hose. Advantageously, the submersible pump is anchored so it does not wash ashore, or otherwise become displaced, with the waves and/or current. The hose can be extended to accommodate any size beach, with the only limitation being the elevation rise above sea level.

Figure 2:
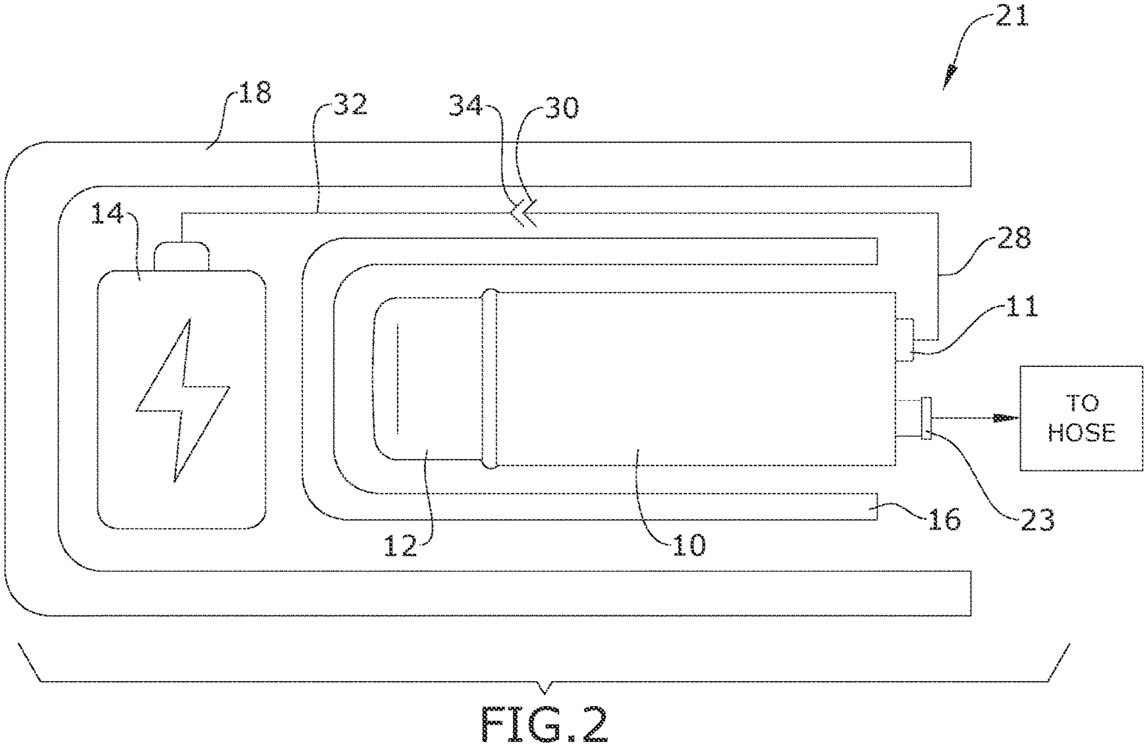
FIG. 2 is a schematic view of a water pump assembly of the embodiment of the present invention.
Figure 3:
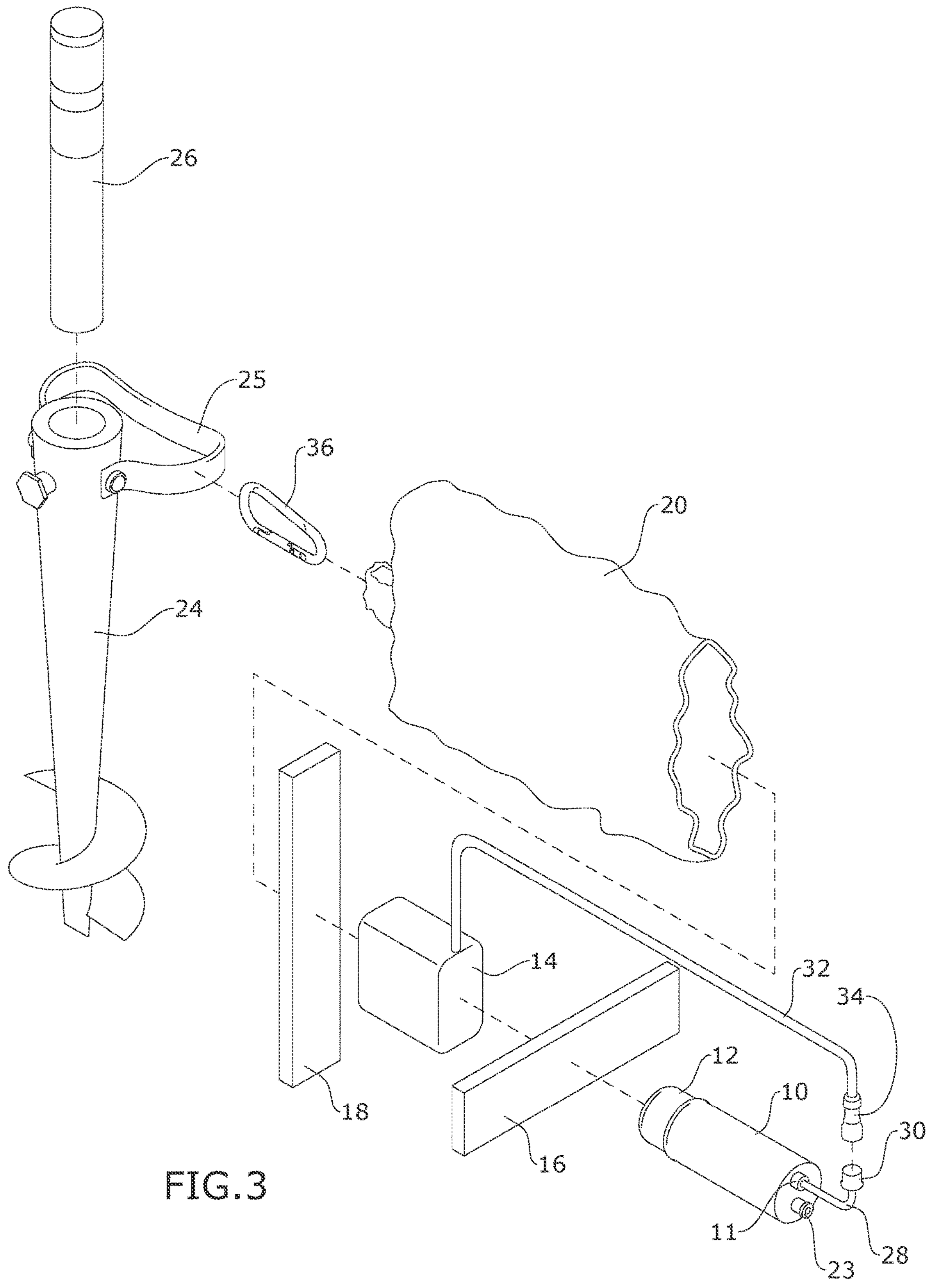
FIG. 3 is an exploded view of the embodiment of the present invention.
Figure 4:
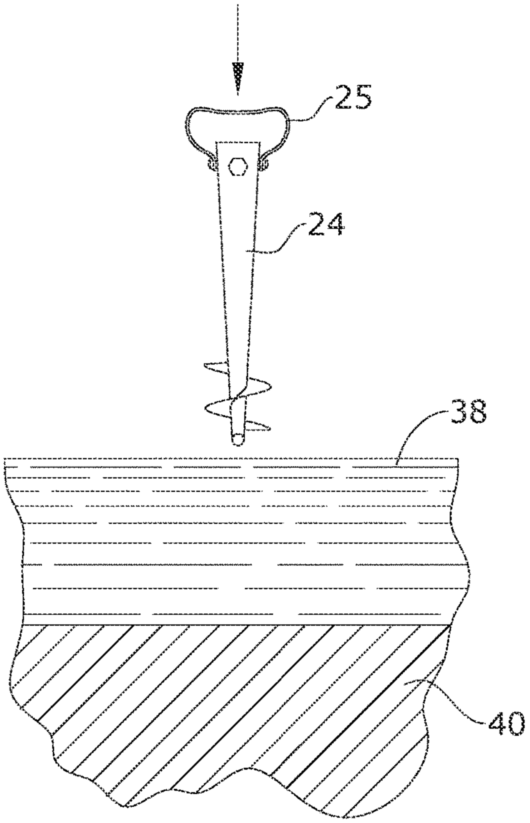
FIG. 4 is a front view of an anchor of the embodiment of the present invention, prior to insertion into the ocean.
Figure 5:
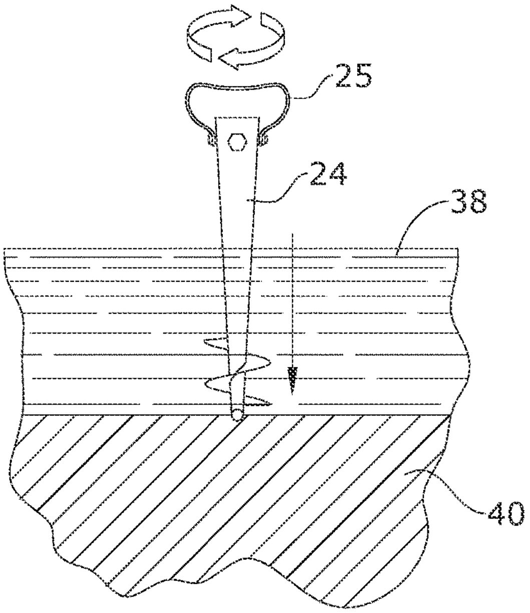
FIG. 5 is another front view of the anchor, similar to FIG. 4, showing insertion of the anchor into the ocean immediately prior to coupling to the ocean floor, with directional arrows shown for illustrative purposes.

Referring to FIGS. 1-8, a submersible pump 10 is provided for pumping water 38 (e.g., ocean water) from a body of water (e.g., the ocean) to shore (e.g., a beach). The submersible pump 10, as shown in FIG. 3, may include a pump power input 11, a pump wire 28, a male connector 28, and a pump hose outlet 23. In order to reduce the number of potential of failure points, in certain embodiments, a power switch may be omitted from the pump 10. As shown in FIG. 3, the male connector 28 electrically couples the pump 10 to a battery 14 via a female connector 34 and battery wire 32. These connectors 28, 38 may be detachable from one another to selectively activate and turn off the pump 10. Other electrical couplings may be appropriate and are within the spirit and scope of the present invention. Further, it will also be appreciated by those with skill in the art that, in other embodiments, rather than using connectors 28, 34 to turn on/off the pump 10, alternatives include incorporation of a power switch or an automatic switch (which may turn on the pump 10 when submerged in water and off when it is removed). Alternatively or additionally, while not illustrated, a solar panel may be integrated therewith for powering the pump 10 (or for charging the battery 14).

On one side thereof, the pump 10 includes a water intake (left side of pump 10, relative to FIG. 2) with a submersible pump filter 12 coupled thereto, with the filter 12 removing particles that cannot be pumped that make it past filter foam 16, 18, and discussed in greater detail below. In use, water 38 is pumped out the hose outlet 23 and through a hose 22 and exiting at a location on shore (e.g., a beach).

The submersible pump 10 is a part of a larger housed assembly 21, which is schematically illustrated in FIG. 2. The assembly 21 includes the pump 10, the battery 14, a first filter foam 16, a second filter foam 18, all of which are inserted into a permeable enclosure 20. In an exemplary embodiment, the assembly 21 is compact in size (e.g., approximately 11 inches long by 4 inches wide by 4 inches tall, and the weight is about 3 pounds). The tubing hose 22 may be about one half inch in diameter, and is sufficiently long enough to extend from a water depth deep enough to have the assembly completely submerged (e.g., about 6 inches of water depth) and then reach the dry sand/land. By way of example, the hose 22 may be approximately 30-35 feet long, although other ranges may be appropriate and are within the spirit and scope of the present invention. One of the primary objectives of the present invention is to be easily portable to the beach and other bodies of water 38, such as one might also bring inflatable floats, buckets, plastic shovels, and other beach toys. Due to the compact size, exemplary embodiments of the present invention pack nicely into a duffle bag, with a combined total weight of about 5 pounds, which is very easy to transport. While other sizes may be used, transportability is an important aspect that has been considered in the context of embodying the present invention.

The two pieces of filter foam 16, 18 extend at least partially around pump 10 where the water intake is disposed to filter out large particles (which are common in large bodies of water) which would otherwise potentially clog the pump 10. Any large enough particles (that the pump 10 would not be able to convey) that make it past these pieces of filter foam 16, 18 are prevented from entering the pump 10 by the filter 12. As shown in FIG. 2, the second filter foam 18 may also partially enclose the battery 14 and electrical couplings to also protect those structures from said particles. The permeable enclosure 20 (e.g., a mesh bag) functions to hold these components (of the housed assembly 21) together and permit water 38 to easily enter and exit.

As mentioned, the filter foam pieces 16, 18 are there to prevent particles too large for the pump to pass through freely, such as to stop rocks, shells, sand, and plant materials like seaweed from entering the pump. The size of "holes" in the filters 12, 16, 18 is a direct correlation to the particular pump being used. Different pumps 10 can handle different size particles. In an exemplary embodiment, filter foam 16, 18 classified as "PPI 20" may be used. PPI (pores per inch) indicates the number of cells in the foam per inch. The standard range is 10-80 PPI. PPI 10 has large cells (large holes) and is more open, while PPI 80 has small cells (small holes), is denser, and has a lower water flow. Ideally, the largest holes possible (smallest number PPI) are used such that the pump 10 can still handle the particles that do get through. Experimentation has proven PPI 40 and higher were too dense.

It is also important to use a pump 10 that excels passing through particles without getting clogged, such as a centrifugal pump (which is used in the presently described embodiment), rather than a diaphragm pump. Diaphragm pumps and other pumps that use rubber seals can easily become clogged even with very small particulate in the water.

The secondary filter (filter 12) is a secondary defense in the case of any particles getting under the first layer of filter foam 16, 18. Similar to the filter foam 16, 18, using the largest "holes" possible creates the best water flow into the pump 10. Also, using the largest "holes" possible allows particles to flow out of the filter foam 16, 18 and not create a build-up of particles within the filter foam 16, 18.

The waves and water current create a "washing" effect of the filter foam 16, 18, keeping the filter foam 16, 18 clear without a build-up of particles on/within/and around it. If using a higher number PPI, which would have smaller holes, then water flow to the pump 10 would be restricted, and would also be continually more restricted with the build-up of particles on/within/and around the filter foam 16, 18. This is also why there is a large surface area for the water intake. It will be appreciated that there is not one area for water intake, but rather a large surface area around the pump to collect water from multiple directions. Water intake from one area would eventually have a build-up of debris materials (rocks, shells, sand, plant matter) that would clog the intake. By having the intake come from multiple directions, if one area gets clogged then the other areas can continue the flow, and since now the flow is coming in from another area there is no inward pressure keeping the debris stuck to and in the filter foam 16, 18, so the debris is free to leave the filter foam 16, 18. This is further enhanced by the "washing" effect by the waves and water current, so once again, the debris is stopped from entering the pump 10, but the debris is also free of a constant inward pressure, which would keep it stuck to and in the filter foam 16, 18 but instead is free to go back out and away from the filter foam 16, 18.

Making reference to FIG. 1, optionally, an anchor 24 may be provided for retaining the permeable enclosure 20 in place. The anchor 24 is, in particular, appropriate in scenarios where the enclosure 20 is likely to be displaced, such as due to waves or water current. The anchor 24 includes a handle 25 for screwably turning and securing the anchor to a floor 40 of the body of water 38 (via, for example, threading at a bottom end thereof). A connector 36, such as a clip, connects the enclosure 20 to the anchor 24. In certain embodiments, the enclosure 20 may be formed as integral with the anchor 24. Further, an optional warning pole 26 may be selectively coupled to a top portion of the anchor 24. The warning pole 26 serves as a marker so that the assembly 21 and anchor 24 does not get stepped on accidentally by a beach goer. Cumulatively, the aforementioned structure forms a portable submersible pump assembly and system.

Figure 6:
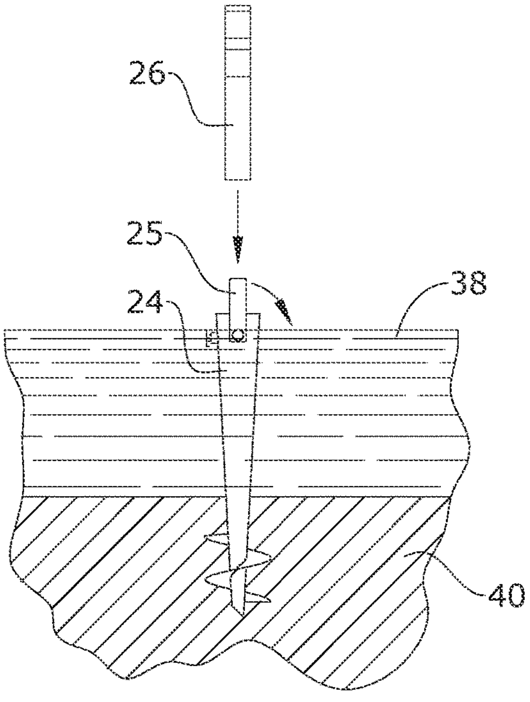
FIG. 6 is another front view of the anchor, similar to FIG. 5, showing installation of a warning pole of the present invention with the anchor.
Figure 7:
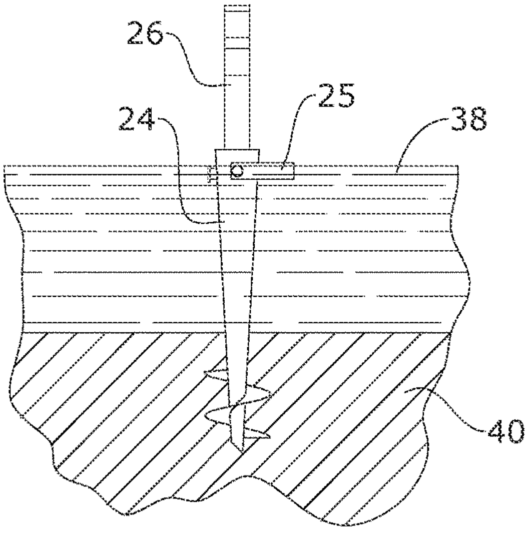
FIG. 7 is another front view of the anchor, similar to FIG. 6, shown with the anchor and warning pole installed.
Figure 8:
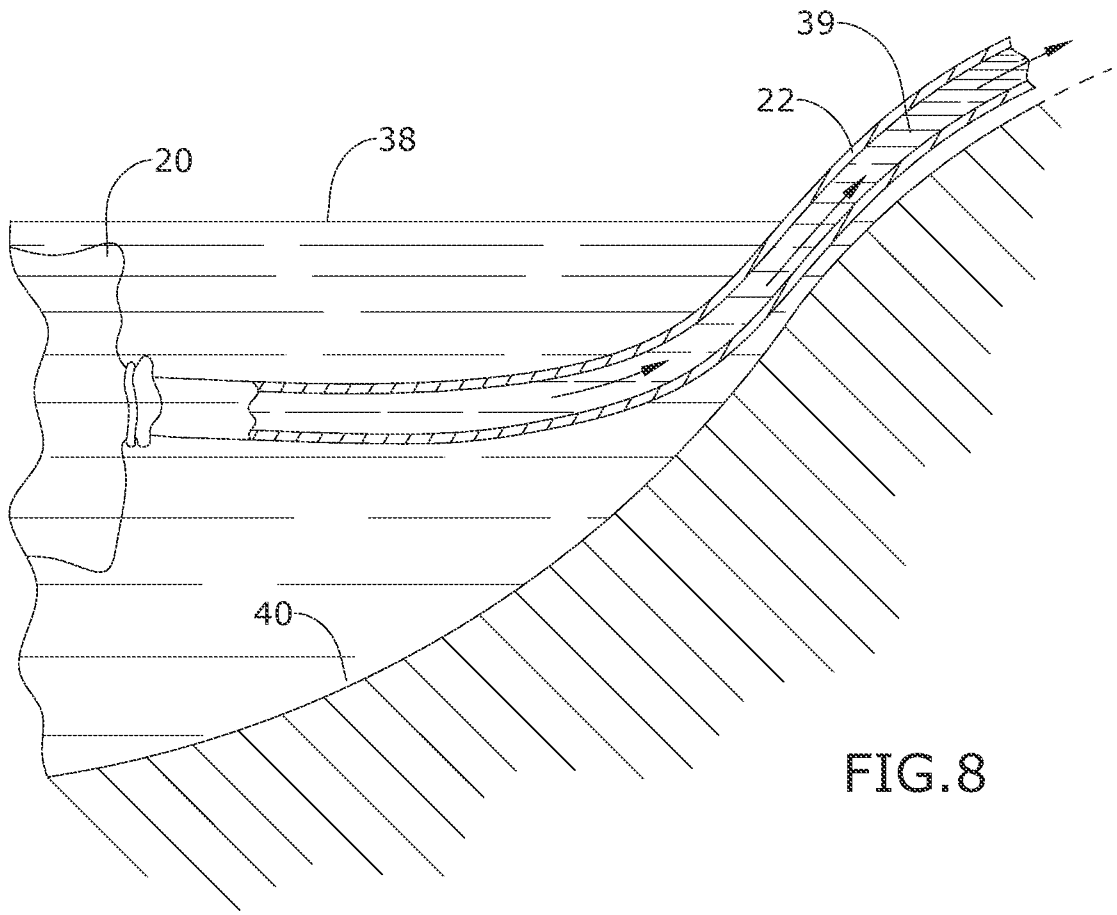
FIG. 8 is a detailed view of the embodiment of the present invention, shown in use, with a portion of a hose shown in section to illustrate the pumping of water.

In use, the enclosure 20, with the water pump assembly 21 contained therewithin, is placed in the water 38. The hose 22, which is coupled to the outlet 23 and extends from the enclosure 20, may be ran up the shore to where the user desires flowing water 39. When displacement of the enclosure 20 is of particular concern, the anchor 24 can be secured to the floor 40 of the body of water, in a manner depicted in FIGS. 4-6. When the anchor touches the floor 40, it may be rotated, using the handle 25, to screw it into the floor 40. Further, and as shown in FIGS. 6 and 7, to increase overall safety, the warning pole 26 may be coupled to an upper end of the anchor 24. The pump 10 may be activated using various techniques described above (e.g., connecting the connectors 28, 34, submerging in water and activating automatically, or turning on a power switch). Alternative uses of the present invention include use as a portable bilge pump for a boat, or anywhere else a user needs to transfer water from one place to another.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An assembly for pumping water from a body of water to a location, the assembly comprising:

a submersible pump configured to be submerged in the body of water and to pump the water;

a power source for powering the submersible pump;

a hose operably coupled to the submersible pump for transporting the water from the body of the water to the location;

at least one filter at least partially enclosing the submersible pump and being configured to filter out particles from the water over a pre-determined size;

an anchor configured to secure to a floor of the body of water and configured to maintain the submersible pump approximately in place in the body of water;

threading at a lower end thereof for securing with the floor of the body of water; and a handle at an upper end thereof for rotating the anchor.

2. The assembly of claim 1, wherein the submersible pump further comprises a submersible pump filter for filtering out particles not captured by the at least one filter.

3. The assembly of claim 1, wherein the at least one filter has approximately 20 pores per inch.

4. The assembly of claim 1, wherein the power source is a battery, a solar panel, or a battery and solar panel combination.

5. The assembly of claim 1, further comprising a warning pole that is couplable to an upper end of the anchor and configured to extend out of the body of water.

6. The assembly of claim 1, further comprising a permeable enclosure wherein the submersible pump and the at least one filter are housed, with the permeable enclosure being detachably couplable to the anchor.

* * * * *